United States Patent [19]

Leachman, Jr. et al.

[11] Patent Number: 5,020,315

[45] Date of Patent: Jun. 4, 1991

[54] MULTIPLE FUNCTION FUEL VALVE AND SYSTEM

[75] Inventors: Frank A. Leachman, Jr., Bristol; Edward F. Cole, Glastonbury, both of Conn.

[73] Assignee: United Technologies Corporation, Hartford, Conn.

[21] Appl. No.: 390,938

[22] Filed: Aug. 8, 1989

[51] Int. Cl.⁵ .................................... F02C 7/232
[52] U.S. Cl. .................................... 60/39.281; 60/734
[58] Field of Search ............... 60/734, 739, 39.281; 137/494, 529

[56] References Cited

U.S. PATENT DOCUMENTS

| | | | |
|---|---|---|---|
| 4,027,474 | 6/1977 | Demase | 60/39.281 |
| 4,171,712 | 10/1979 | DeForrest | 137/529 |
| 4,202,171 | 5/1980 | Jurisch et al. | 60/39.28 R |
| 4,449,359 | 5/1984 | Cole et al. | 60/39.281 |
| 4,449,548 | 5/1984 | Tutherly | 137/468 |
| 4,493,187 | 1/1985 | Hansen | 60/39.281 |
| 4,660,595 | 4/1987 | Käster et al. | 137/494 |
| 4,876,857 | 10/1989 | Feltz et al. | 60/734 |

Primary Examiner—Louis J. Casaregola
Attorney, Agent, or Firm—Edward L. Kochey, Jr.

[57] ABSTRACT

A floating piston (54) has a valved (86) vent opening (88), with the vent opening closing (92) on movement of the piston. The piston is spring loaded (56, 58) to vent air, but seal fuel. Modulation of pressure in pressure resisting chamber (48) between pump discharge and lower pressures, provides control of the valve. Pressure difference (96, 62) and valve position (36) measurements provide flow measurement data.

30 Claims, 5 Drawing Sheets

MULTIPLE FUNCTION FUEL VALVE AND SYSTEM

TECHNICAL FIELD

The invention relates to aircraft gas turbine engines and in particular to a fuel supply therefor.

BACKGROUND OF THE INVENTION

Fuel systems for aircraft gas turbine engines typically include a means for controlling flow rate, as well as a minimum pressure valve, a fuel distribution valve or valves and a positive shutoff valve. The minimum pressure valve prevents fuel flow to the engine burners until a minimum pressure rise has developed across the fuel pump. This minimum pressure rise is required to provide adequate hydraulic force to insure correct operation of engine servo systems which use pressurized fuel for actuation.

The distribution valve provides approximately equal fuel flow to all the engine fuel burner nozzles. A separate flow exit port is generally provided in the valve for each fuel nozzle or small group of nozzles. The arrangement is designed with the fuel pressure drop across this valve window large compared to the static head of fuel from the bottom to the top of the engine. Accordingly, flow to each burner nozzle is relatively independent of the vertical height location of the nozzle on the engine. If the distribution valve were not present, the nozzles at the bottom of the engine would operate at a higher pressure than those at the top of the engine, particularly at low ratings, and these lower nozzles would therefore receive more fuel. This could result in overheating of the lower burners and a consequent reduction in burner or turbine life.

A fuel reprime function must also be provided in most engine fuel systems. If one aircraft fuel tank runs dry, the fuel pump must be capable of removing the air from the pump inlet line and re-establishing fuel flow after switching to an alternate tank. The air removed from the pump inlet line must either be compressed into the pump discharge line or pumped through the pump discharge line, minimum pressure valve, distribution valve, and fuel nozzles out to ambient atmosphere. Since there may be fuel in the line downstream of the pump, the alternative of discharging the fuel is preferred to that of just compressing the air. In any event the fuel must be moved sufficiently that the pump is receiving fuel and able to pump such fuel.

The fuel distribution valve often contains a positive fuel shutoff feature. This usually requires a minimum pressure difference of approximately 20 psi to open. This pressure is sufficient to prevent boiling of the fuel by keeping the vapor pressure sufficiently high with respect to the engine case ambient temperature following shutdown so that boiling fuel does not expand and enter the burners.

During reprime operation the fuel pump must pump air against the 20 psi valve back pressure. Fuel pumps usually cannot generate sufficient pressure when pumping air and they therefore must use other means such as tank mounted boost pumps to effect reprime.

In some existing fuel systems a solenoid valve operated by the aircraft pilot is opened to pump discharge air overboard during reprime operation. This is undesirable because it requires the pilot to turn the solenoid valve off after reprime has been established. If the pilot forgets to turn off this valve, fuel will be continuously pumped overboard through the open valve.

In most existing fuel systems, a metering valve (flow control valve) is used to control fuel to the engine. This valve typically comprises a spool valve with means provided for actuation and spool translation readout. A separate pressure regulating valve maintains the pressure differential across this valve constant. Therefore, the stroke of the metering valve spool can be related to the open flow area of the valve with this area being proportional to fuel flow. The calculated fuel flow value can be used for engine control and managing aircraft fuel resources.

It is possible to dispense with the metering valve and instead modulate pump speed for the purpose of controlling flow. With such a system some alternate means for measuring fuel flow is desirable for use as a feedback element in controlling pump speed. Present fuel flow meters are either unacceptably expensive, susceptible to failure during exposure to fuel contamination, or too large for aircraft installation.

SUMMARY OF THE INVENTION

A fuel control system and multiple function fuel valve combines the functions of the minimum pressure, distribution and positive shutoff valves used in aircraft fuel systems. The valve also includes means for automatically venting the fuel pump discharge line into the ambient atmosphere through the engine burner fuel nozzles during reprime operation. It provides means for reliably measuring engine fuel flow. In one embodiment this valve may also be used to actually meter or control the fuel flow rate.

This combination of elements results in significant savings to the fuel system size, weight and cost as compared with present systems in which these functions are performed by separate components.

The multiple function valve has a valve body with an inlet pressure chamber at one end and a resisting pressure chamber at the other end. A piston is located within a central compartment and exposed to the pressures within the two chambers. The piston carries within it an annular recess between the two ends for fluid communication with various components.

Two springs resist movement of the piston toward the resisting pressure chamber with these springs being arranged so that a lesser spring rate occurs during a first increment of motion and a greater spring rate during the remainder of the motion. There are a plurality of outlet ports which move into fluid communication with a distribution chamber formed by the annular recess at various times and in various amounts. There is also a supply opening through the body and fluid communication with the inlet pressure chamber and with the compartment, with this opening being progressively exposed to the distribution chamber as the piston moves through its chamber.

A vent opening which is closeable with the valve, passes through the piston, in fluid communication with at least one of the outlets, when the piston is at the closed end of the travel adjacent to the inlet pressure chamber. This vent opening is orificed.

During operation, if the fuel pump is pumping air it cannot build up a great deal of pressure and the low flow of fuel or the flow of air passes through the open vent line to discharge. As the liquid fuel reaches the pump the pumping action increases with the flow and pressure increasing. Because of the restriction through the vent opening, a back pressure is built up causing the piston to move up against the lower spring rate to such a point where the vent line is cut off from the discharge. Further increase moves the piston upwardly progressively exposing the distribution chamber to both the supply opening and the discharge ports. Accordingly, a first pressure drop is achieved between the inlet and the distribution chamber, and a second one between the distribution chamber and the outlet ports.

The pressure drop entering the chamber represents a common flow. The pressure drop and flow opening may be related to obtain a reading of the flow quantity. The pressure drop leaving the chamber is established for each of the lines thereby providing the required pressure drop for appropriate distribution of fuel between the various fuel discharge lines.

Inherently the pump discharge pressure is established at the fuel inlet pressure chamber. By placing this same discharge pressure in the resisting pressure chamber, the fluid pressure forces are balanced. The springs therefore urge the valve toward the closed end and maintain the valve closed for shutoff.

When the pressure resisting chamber is exposed to pump suction pressure an unbalance occurs with the piston moving and the inlet pressure forces being balanced against the compressed springs. Appropriate characterization of the various ports can lead to the desired pressure and flow distributions.

With respect to the second embodiment of the invention, the pressure in the resisting pressure chamber may be varied over the entire range between pump discharge and pump suction pressure whereby variation of this pressure may be used to control the opening of the valve and fuel flow rate to the engine.

DESCRIPTION OF THE PREFERRED EMBODIMENT

Figure 1:
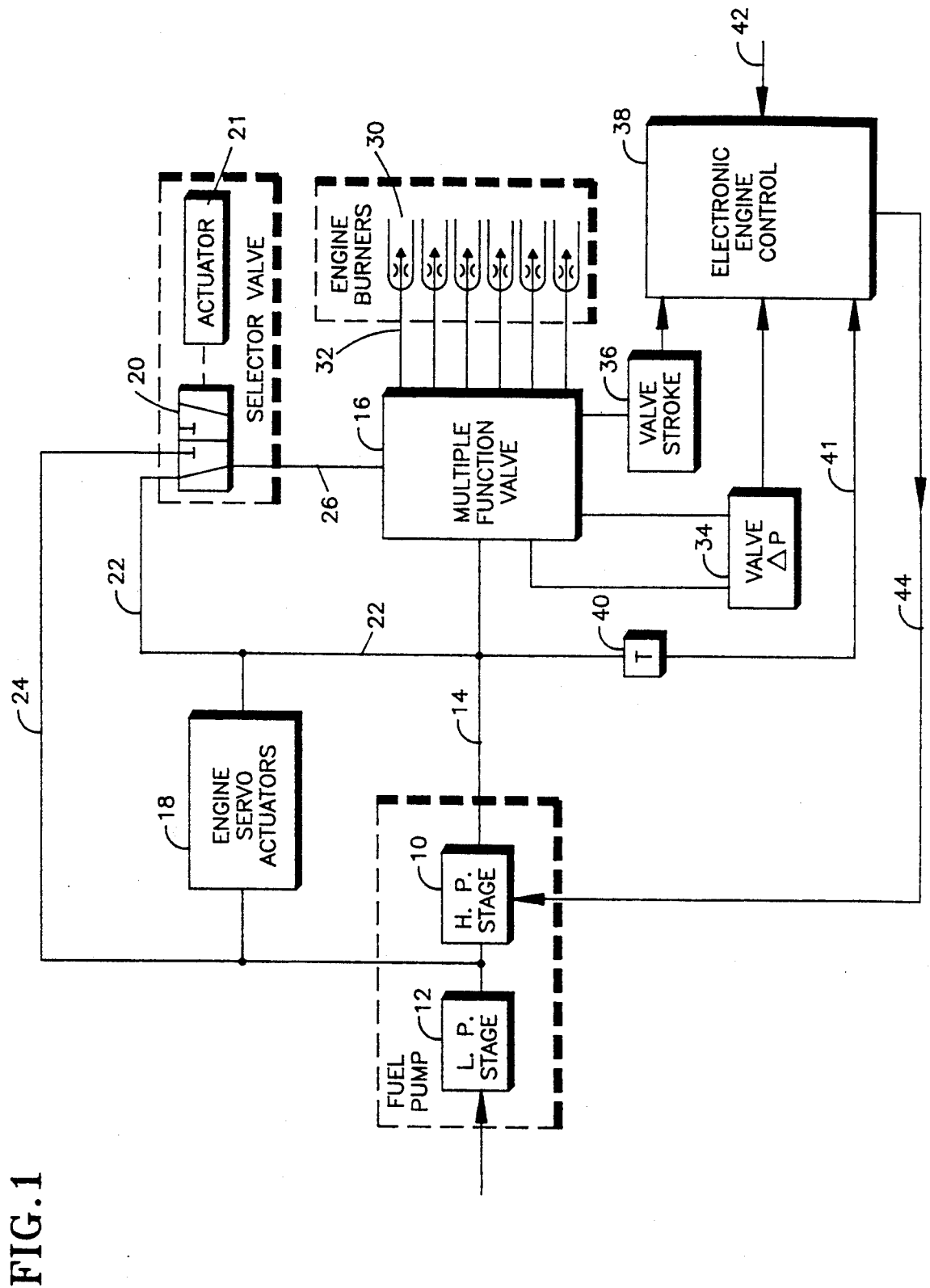
FIG. 1 is a schematic of a fuel supply system using the multifunction valve.

Fuel to high pressure fuel pump stage 10 is delivered by low pressure fuel pump stage 12 which supplies usually 10 to 20 percent of the pressure rise. The interstage pressure is sufficient to provide net positive suction head at the inlet of the high pressure pump stage. The pressurized fuel is passed through conduit 14 to multiple function fuel valve 16. This pressurized fuel is also utilized to operate engine servo actuators 18.

The details of the multiple function valve 16 will be described hereinafter. At this point it should be noted that selector valve 20 operated by actuator 21 selects either pump discharge pressure from line 22 or pump interstage pressure from line 24 and applies the appropriate pressure through line 26 passing to multiple function valve 16.

It is also noted that a plurality of engine burner nozzles 30 are supplied by a plurality of independent fuel lines 32 from the multiple function valve. A valve pressure differential (discussed more hereinafter) is sensed by pressure differential sensor 34 while valve stroke is sensed by position sensor 36 with this information transferred to the electronic engine control 38. Temperature sensor 40 also passes a temperature signal 41 to the engine control. A flow setpoint 42 is also introduced. On the basis of the valve stroke, which represents a known opening area and the pressure drop, the electronic engine control can calculate the flow passing through the valve. If needed, temperature correction may be added, with the sensed flow compared to the setpoint or desired flow. A control signal passes from the engine control 38 through line 44 to the high pressure fuel pump 10 to control it to the appropriate speed.

Figure 2:
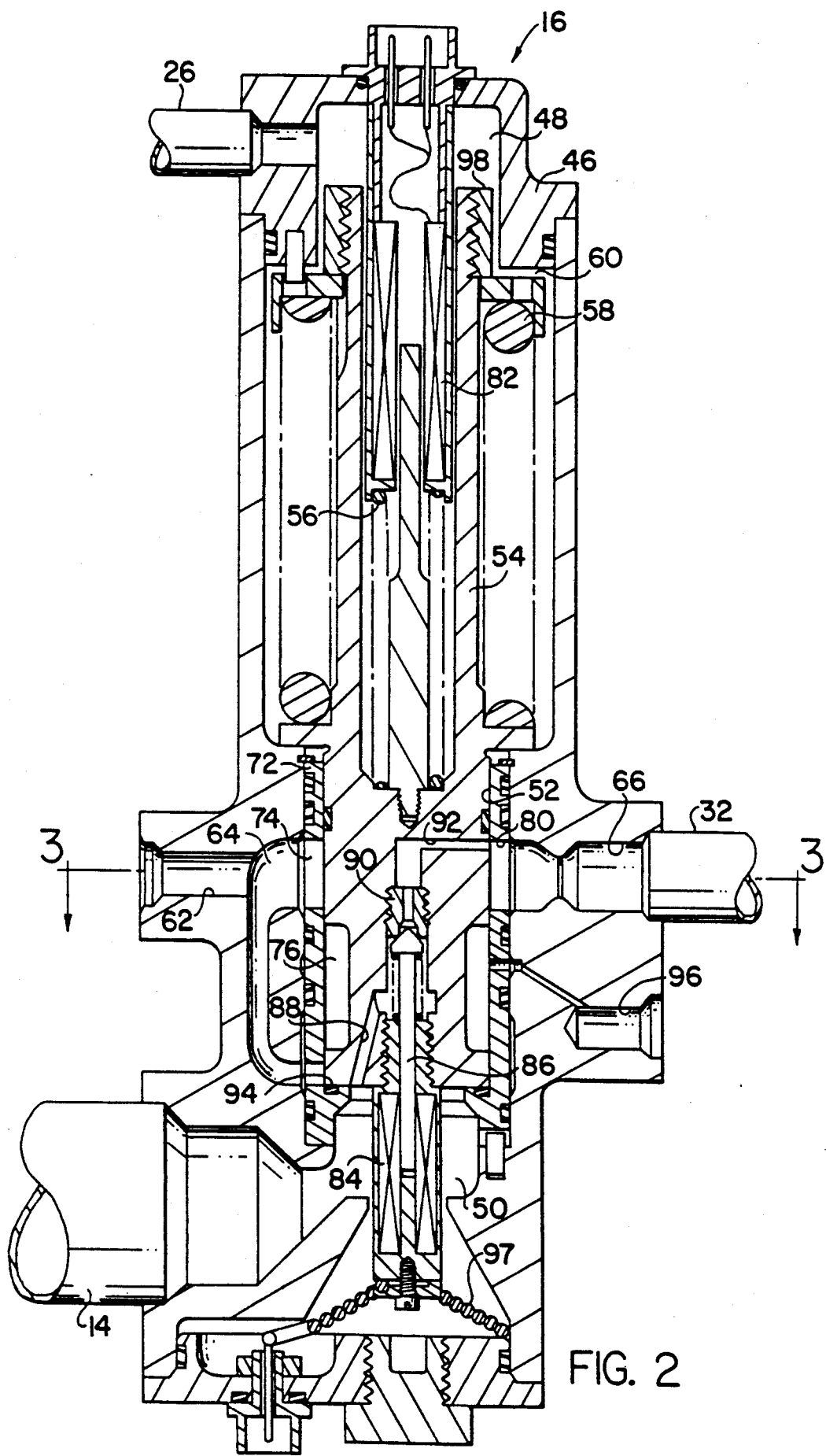
FIG. 2 is a side sectional elevation through the valve.

Referring to FIG. 2 the multi-function valve 16 has a valve body 46 and a resisting pressure chamber 48 with this chamber being in fluid communication with line 26. At the other end of the valve there is an inlet pressure chamber 50 receiving fuel from line 14. In between these two chambers is a piston receiving compartment 52 within which a piston 54 is axially slideable.

First spring 56 operates between a portion of the valve body and the piston to urge the piston downwardly or closed. A second spring 58 also operates against the piston and after passing through a first increment represented by lost motion space 60 it also operates against the valve body to urge the piston downwardly. Therefore, a lower spring rate occurs during the first increment of travel when only spring 56 is resisting motion, while an increased spring rate occurs thereafter with both springs 56 and 58 cooperating to urge the piston downwardly.

Figure 3:
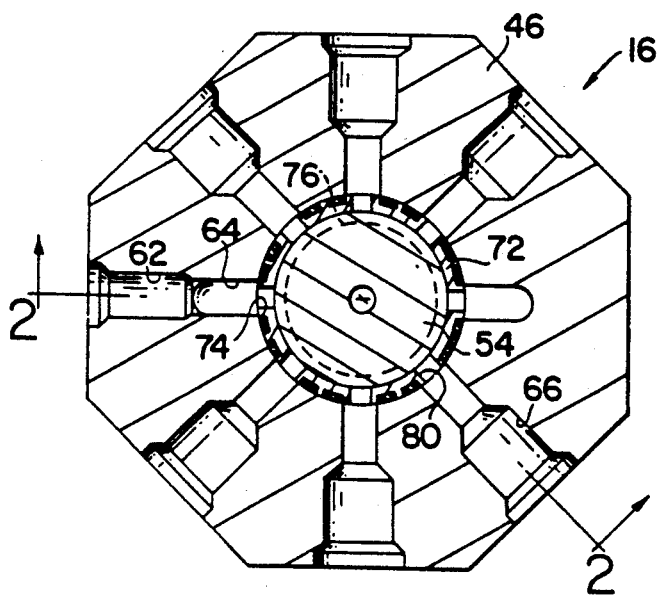
FIG. 3 is a plan sectional view through the valve.

Attention is momentarily drawn to FIG. 3 where section lines 2—2 show the section illustrated in FIG. 2. It is pointed out that the left side of the section passes through the pressure tap 62 and the supply opening 64 while the right side is a section taken through one of a plurality of outlet ports 66.

Figure 4:
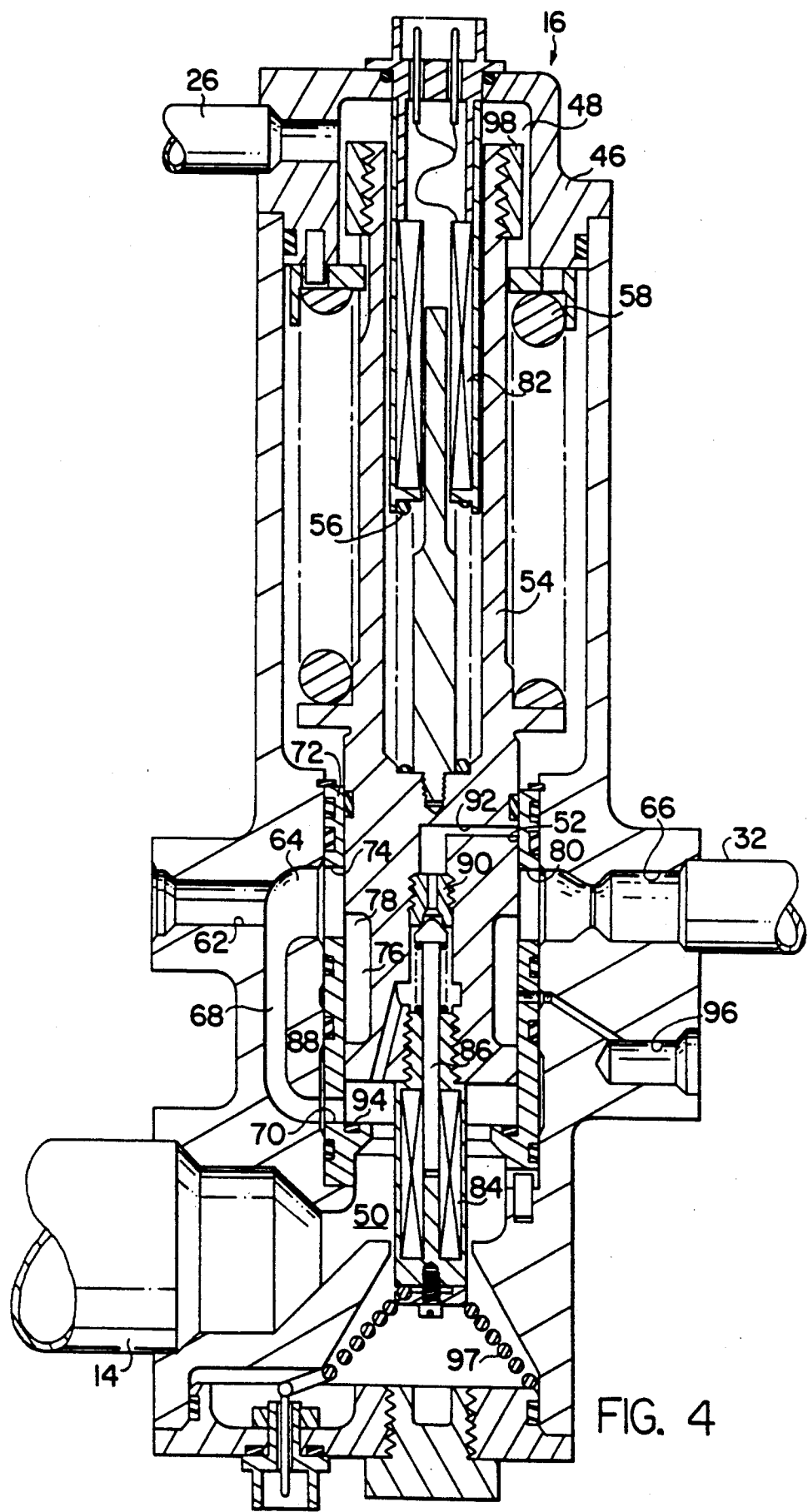
FIG. 4 is a side sectional elevation of the valve of FIG. 2 partially open.

The normal flowpath through the valve is best seen with reference to FIG. 4 where the valve is shown in the partially open position. Flow from the inlet chamber 50 enters supply opening 68 by passing under the bottom of piston 54 through a wide opening 70. The sleeve 72 which is stationary and forms a portion of the valve body has a relatively tall but narrow slot 74 at the outlet of the supply opening. This slot may be shaped as desired to achieve proper characterization of the valve. The flow passes through this slot into distribution chamber 76 formed by an annular recess 78 in the piston. This is a common distribution chamber around the circumference of the piston.

From this distribution chamber the flow passes through a plurality of outlet slots 80 in the sleeve each communicating with an appropriate discharge port 66.

It is noted that the generous size achieved by the width of the opening 70 results in an insignificant pressure drop there while the restriction through slot 74 in combination with the distribution chamber results in a significant pressure drop at this location. Furthermore, a significant pressure drop occurs between the distribution chamber and the outlet ports. The first pressure drop may be used in conjunction with the known opening to establish a flow through the valve, while the second pressure drop at the outlet provides the necessary pressure drops for distribution between the various burner nozzles.

In order that the flow opening may be known to provide a basis for calculating flows, position sensor coils 82 sense the axial position of the piston.

During initial startup of the engine the valve is in the position illustrated in FIG. 2. Coil 84 is energized opening poppet valve 86. This opens the vent 88 which passes through the piston through the inlet chamber 50 to at least one of the discharge ports 66. A flow restriction or orifice 90 is located within this line. When the fuel pump is started it may be pumping air and accordingly either air or fuel flowing at a low rate passes through this vent opening achieving venting into the combustion chamber. As soon as the pump receives liquid, the flow increases establishing an increased pressure drop through this orifice vent line resulting in an increased pressure in the inlet chamber. Since the resisting pressure chamber is exposed to the pump interstage pressure or reduced pressure region, this causes the piston to move upwardly against the single spring at a lower spring rate a first increment.

In moving this increment the exit port 92 of the vent moves out of engagement with the discharge port, interfacing with the surface of the sleeve. Accordingly, the venting action automatically stops with a back pressure being established. This first increment of movement lifts the piston off of seal 94, which operated to close off and intercept the supply openings 64. The fuel may not flow at this time, however, since opening 74 is not in communication with the distribution chamber 76.

If the pump is running against the closed valve, the pressure would almost instantaneously increase thereby forcing the piston upwardly against the springs somewhat as illustrated in FIG. 4. In the particular arrangement being described the quantity of flow is controlled by apparatus other than this valve so that this valve has a piston which floats against the spring, its position being established by the inlet pressure as balanced by the pump interstage pressure on the other side plus the springs.

Pressure tap 96 remains in fluid communication with the distribution chamber so that this may be used in conjunction with the pressure tap 62 to establish the pressure drop across the inlet of the distribution chamber. The position of selector valves shown in FIG. 1 places the pump discharge pressure in the resisting pressure chamber whereby the valve is closed by action of the spring. This achieves positive shutoff of the valve as desired when the engine is not operating.

Fuel turnon is commanded by moving the selector valve 20 to the alternate position thereby placing pump interstage pressure in the resisting pressure chamber. At the same time solenoid coil 84 is energized, and may remain energized during all engine running. By this means the plunger 86 moves downward against the stop opening the vent line. The springs 56 and 58 are designed to provide appropriate closing force to establish a minimum back pressure with pump interstage pressure in the upper chamber.

During normal engine operation the piston is unseated, and therefore exit port 92 of vent 88 is closed. Maintaining solenoid 84 energized precludes complete stoppage of fuel flow if the piston seats. In the FIG. 2 embodiment the solenoid and plunger 86 are carried on the piston. Coiled flexible lead 97 carries current to the solenoid.

The pressure sensor 34 of FIG. 1 is connected between ports 62 and 96 of the valve, with this pressure difference used in conjunction with valve strokes sensed by position sensor 36 to establish flow. This calculation is performed in the electronic engine control 38.

It is also noted that maximum flow of the valve may be established by adjusting nut 98 whereby it abuts against the body blocking further movement of the piston and accordingly further opening of the valve.

The multifunction valve of FIG. 2 combines the functions of establishing a minimum back pressure, distribution of fuel to the various burners, positive shutoff of the fuel line, automatic venting of the fuel line during reprime operation, and measuring engine fuel flow. It is not intended, however, to actually operate as a metering valve to control the quantity of fuel flow.

Figure 5:
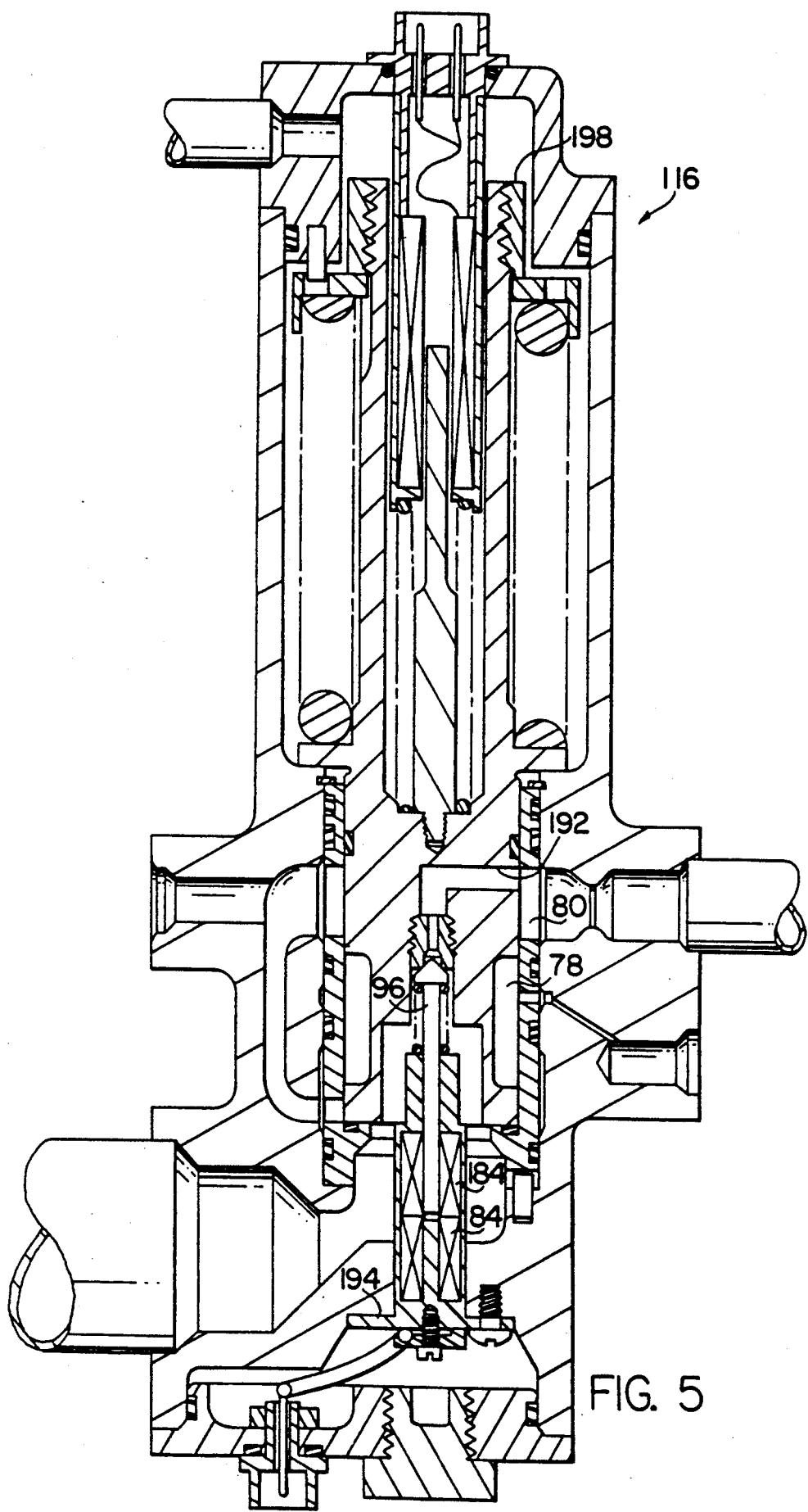
FIG. 5 is a side sectional elevation of an alternate valve for metering type operation.
Figure 6:
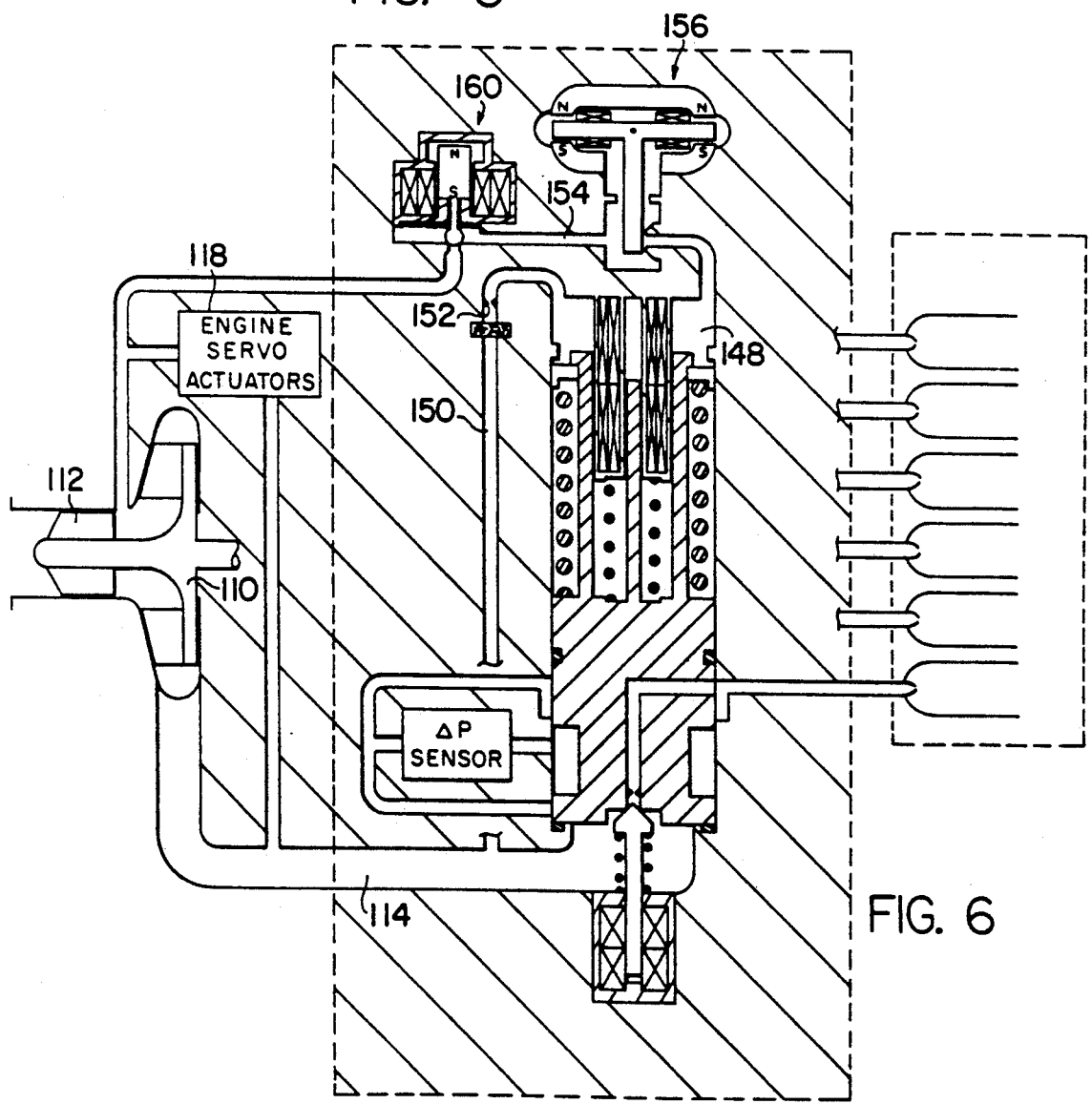
FIG. 6 is a schematic of a fuel supply system using the valve of FIG. 5.

FIG. 5 includes a modification to make the valve more amenable to such metering type operation in a system as illustrated in FIG. 6. With valve 116 operating as metering valve it carries the responsibility for limiting flow and accordingly the adjustment of nut 198 is very significant since this establishes the maximum opening the valve will permit.

Operation of the valve as a metering valve also imposes upon it the obligation to supply a minimum fuel flow during transients without inadvertently overrunning and shutting off the fuel supply. This is accomplished by a modification of the outlet 192 of the vent line and in particular its relationship with the spacing between the distribution chamber 78 and the outlet port window 80. The inlet window 74 must also operate in conjunction with the outlet port. During normal operation of the engine the poppet valve 96 is always maintained open by continuous energization of coil 84. A redundant coil 184 may be supplied as a backup. The outlet of vent 192 with respect to the window 80 is located such that as the outlet vent is closed off there is a simultaneous opening of the flowpath from distribution chamber 78 to the outlet port. This accordingly provides a continuous flowpath for the minimum fuel requirements even should the piston override and seat entirely.

As earlier noted with respect to the valve of FIG. 2 the solenoid 84 of FIG. 5 may remain energized during all normal operation. The outlet of vent 192 is closed, so there is no need to close the poppet valve 96 when the piston is not in its seated position. An alternate support of the solenoid and plunger is shown where they are carried on the valve body by support 194. This avoids the continuous flexing of flexible lead 97 of FIG. 2. The plunge may be permitted to follow the piston (if the solenoid were deenergized), or restricted in axial movement as desired.

In FIG. 6 an initial stage 112 of the feed pump supplies fuel to the high pressure stage 110 of the pump. The fuel is delivered into the pressurized fuel line 114 with a portion again used to operate actuators 118. Another portion of the pressurzied fuel flows through a first conduit 150 from the pump discharge to the resisting pressure chamber 148. This line contains an orifice 152. A second conduit 154 is connected from the chamber 148 to the interstage region at the inlet of the high pressure pump. A modulated flow controller 156 throttles flow passing through this line so that in conjunction with orifice 152 the pressure in pressure resisting chamber 148 can substantially be controlled to any pressure between the pump discharge and a pressure level approaching that at pump interstage. It can be seen that modulation of pressure in this chamber operates to vary the position of the piston and accordingly affect various restriction of the flow passages between the windows. A bistable solenoid operated valve 160 is also located in a second conduit with this valve being latched into its last position following removal of coil current. When latched into the "off" position (valve closed) flow ceases and the pressure in chamber 148 rises to pump discharge pressure. This balances the piston shutting off fuel flow to the burner nozzles.

What is claimed is:

1. A multiple function fuel valve comprising:
   a valve body having an inlet pressure chamber at one end, a resisting pressure chamber at the other end, and a central piston receiving compartment between said chambers;
   a piston slidable within said compartment and exposed to said inlet pressure chamber and to said resisting pressure chamber, and having an annular recess between the two ends forming a distribution chamber within said compartment;
   a first spring between said body and said piston resisting movement of said piston toward said resisting pressure chamber;
   a second spring between said body and said piston resisting movement of said piston toward said resisting pressure chamber;
   said first and second springs arranged to produce a lesser spring rate during a first increment portion of the travel of said piston and a greater spring rate during the remainder of the travel of said piston;
   a plurality of outlet ports through said body in fluid communication with said compartment;
   an inlet port through said body in fluid communication with said inlet pressure chamber;
   at least one supply opening through said body in fluid communication with said inlet pressure chamber and said compartment;
   said distribution chamber alternately out of fluid communication and in simultaneous fluid communication with both said outlet ports and said supply opening, depending on the axial position of said piston;
   a vent opening through said piston in fluid communication with said inlet pressure chamber and at least one of said outlet ports when said piston is at the limit of axial travel toward said inlet pressure chamber, but out of fluid communication with said at least one outlet port when said piston is remote from said inlet pressure chamber; and
   a fluid flow restriction in said vent opening.

2. A valve as in claim 1:
   said vent opening out of fluid communication with said at least one outlet port after said first increment of travel of said piston.

3. A valve as in claim 2:
   a vent valve located within said vent opening operable to an open or closed position.

4. A valve as in claim 3:
   said piston sealed against said body in the extreme axial position closest to said inlet pressure chamber in a manner to close said supply opening.

5. A valve as in claim 2:
   said distribution chamber in simultaneous fluid communication with both said outlet ports and said supply opening only after said first increment of travel of said piston.

6. A valve as in claim 2:
   said vent opening in fluid communication with all of said outlet ports;
   said distribution chamber coming into fluid communication with said outlet ports before said vent opening moves out of fluid, communication with said outlet ports as said piston moves axially.

7. A valve as in claim 2:
   said body including a fixed internal sleeve forming said piston receiving compartment.

8. A valve as in claim 7:
   the flow area between said supply opening and said annular recess increasing in flow area with the travel of said piston away from said inlet pressure chamber.

9. A valve as in claim 8:
   said supply opening having an axially elongated slot at its exit, whereby a desired flow area to piston travel characteristic may be obtained.

10. A valve as in claim 9:
    a pressure tap in fluid communication with said supply opening; and
    a pressure tap in fluid communication with said annular chamber, whereby pressure drop from the supply opening to the annular chamber may be measured.

11. A valve as in claim 8:
    position sensing means for sensing the axial travel position of said piston.

12. A valve as in claim 2:
    an adjustable stop on said piston interfacing with said body for limiting the maximum travel of said piston in the direction towards said resisting pressure chamber.

13. A valve as in claim 3:
    said distribution chamber in simultaneous fluid communication with both said outlet ports and said supply opening only after said first increment of travel of said piston.

14. A valve as in claim 13:
    the flow area between said supply opening and said annular recess increasing in flow area with the travel of said piston away from said inlet pressure chamber.

15. A valve as in claim 14:
    said supply opening having an axially elongated slot at its exit, whereby a desired flow area to piston travel characteristic may be obtained.

16. A valve as in claim 3:
    a pressure tap in fluid communication with said supply opening; and
    a pressure tap in fluid communication with said annular chamber, whereby pressure drop from the supply opening to the annular chamber may be measured.

17. A valve as in claim 16:
    position sensing means for sensing the axial travel position of said piston.

18. A valve as in claim 17:
    said supply opening having an axially elongated slot at its exit, whereby a desired flow area to piston travel characteristic may be obtained.

19. A valve as in claim 2:
    a pressure tap in fluid communication with said supply opening;
    a pressure tap in fluid communication with said annular chamber, whereby pressure drop from the supply opening to the annular chamber may be measured; and
    position sensing means for sensing the axial travel position of said piston.

20. A valve as in claim 19:

said supply opening having an axially elongated slot at its exit, whereby a desired flow area to piston travel characteristic may be obtained.

21. A valve as in claim 3:
said vent valve supported on and floating with said piston.

22. A valve as in claim 3:
said vent valve including actuating means supported on said valve body, and a closeable port in said piston.

23. An aircraft engine fuel supply system comprising:
a multifunction valve including:
a valve body having an inlet pressure chamber at one end, a resisting pressure chamber at the other end, and a central piston receiving compartment between said chambers;
a piston slidable within said compartment and exposed to said inlet pressure chamber and to said resisting pressure chamber, and having an annular recess between the two ends forming a distribution chamber within said compartment;
a first spring between said body and said piston resisting movement of said piston toward said resisting pressure chamber;
a second spring between said body and said piston resisting movement of said piston toward said resisting pressure chamber;
said first and second springs arranged to produce a lesser spring rate during a first increment portion of the travel of said piston and a greater spring rate during the remainder of the travel of said piston;
a plurality of outlet ports through said body in fluid communication with said compartment;
an inlet port through said body and fluid communication with said inlet pressure chamber;
at least one supply opening through said body in fluid communication with said inlet pressure chamber and said compartment;
said distribution chamber alternately out of fluid communication and in simultaneous fluid communication with both said outlet ports and said supply opening, depending on the axial position of said piston;
a vent opening through said piston in fluid communication with said inlet pressure chamber and at least one of said outlet ports when said piston is at the limit of axial travel toward said inlet pressure chamber, but out of fluid communication with said one
outlet port when said piston is remote from said inlet pressure chamber; and
a fluid flow restriction in said vent opening;
a high pressure fuel pump;
a fuel conduit from said high pressure pump to said inlet pressure chamber; and
selection means for selectively connecting said resisting pressure chamber to the discharge side of said pump or to the suction side of said pump.

24. A supply system as in claim 23:
said selection means comprising a selector valve alternately exposing the pump discharge or pump reduced-pressure region to said resisting pressure chamber.

25. A fuel supply system as in claim 23:
position sensing means for sensing the axial travel position of said piston within said valve;
a pressure differential sensor for sensing the pressure drop for said supply opening to said distribution chamber; and
means for relating a sensed pressure difference and a sensed piston position for determining the fuel flow.

26. A fuel supply system as in claim 23:
means for selectively varying the pressure in said resisting pressure chamber between the pump discharge pressure and the pump suction pressure.

27. A supply system as in claim 26, wherein said means for selectively varying the pressure comprises:
a first conduit from the discharge of said high pressure pump to said resisting pressure chamber;
a fixed flow resistor in said first conduit;
a second conduit from said resisting pressure chamber to the suction side of said pump; and
a variable flow restrictor in said second conduit 28. A fuel supply system as in claim 27 having also:
a shutoff valve in said second conduit.

29. A fuel supply system as in claim 25:
means for selectively varying the pressure in said resisting pressure chamber between the pump discharge pressure and the pump reduced-pressure region.

30. A valve as in claim 29:
a vent valve located within said vent opening operable to an open or closed position.

* * * * *